United States Patent
Kuwata

(10) Patent No.: US 7,340,186 B2
(45) Date of Patent: Mar. 4, 2008

(54) DISCRIMINATION PHASE MARGIN MONITOR CIRCUIT, TRANSMITTING/RECEIVING DEVICE AND COMMUNICATION SYSTEM

(75) Inventor: Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 10/936,544

(22) Filed: Sep. 9, 2004

(65) Prior Publication Data

US 2005/0226634 A1  Oct. 13, 2005

(30) Foreign Application Priority Data

Mar. 31, 2004  (JP)  ............................ 2004-108229

(51) Int. Cl.
*H04B 10/06*  (2006.01)

(52) U.S. Cl. ...................... 398/208; 398/155; 398/154; 398/202; 398/208; 398/162; 398/209; 398/163; 398/213; 398/214; 398/79; 398/141; 398/158; 398/159; 398/175; 398/183; 398/195; 398/192; 398/293; 398/196; 398/197; 398/118; 375/317; 375/318; 375/222; 375/225; 375/224; 375/226; 375/326; 375/327; 327/60; 327/72; 327/74; 327/76

(58) Field of Classification Search ................ 398/155, 398/154, 202, 208, 162, 209, 163, 213, 214, 398/79, 141, 158, 159, 175, 183, 195, 192, 398/193, 196, 197, 198; 375/317, 222, 225, 375/318, 226, 224, 319, 326, 327; 327/60, 327/72, 74, 76

See application file for complete search history.

(56) References Cited

U.S. PATENT DOCUMENTS

| | | | | |
|---|---|---|---|---|
| 4,475,210 A | * | 10/1984 | Couch | ......................... 375/224 |
| 4,514,854 A | * | 4/1985 | Ashida | ........................ 375/340 |
| 5,736,875 A | | 4/1998 | Sakamoto et al. | |
| 5,920,414 A | * | 7/1999 | Miyachi et al. | ................ 398/14 |
| 7,088,927 B2 | * | 8/2006 | Taga et al. | ................... 398/202 |
| 2003/0058507 A1 | * | 3/2003 | Oomori | ........................ 359/177 |

FOREIGN PATENT DOCUMENTS

| | | |
|---|---|---|
| JP | 8-265375 | 10/1996 |
| JP | 11-68674 | 3/1999 |

* cited by examiner

*Primary Examiner*—Hanh Phan
(74) *Attorney, Agent, or Firm*—Staas & Halsey LLP

(57) ABSTRACT

The discrimination phase margin monitor circuit (10) of the present invention comprises a first discrimination circuit (11 and 12) discriminating an input data signal using a clock signal extracted from the input data signal, a second discrimination circuit (13 and 14) discriminating the input data signal using a clock signal with a frequency different from that of the clock and an operation circuit (15 and 16) calculating the exclusive OR of the output signal of the first discrimination circuit and that of the second discrimination circuit and obtaining a phase margin monitor output signal by averaging the exclusive ORs.

15 Claims, 13 Drawing Sheets

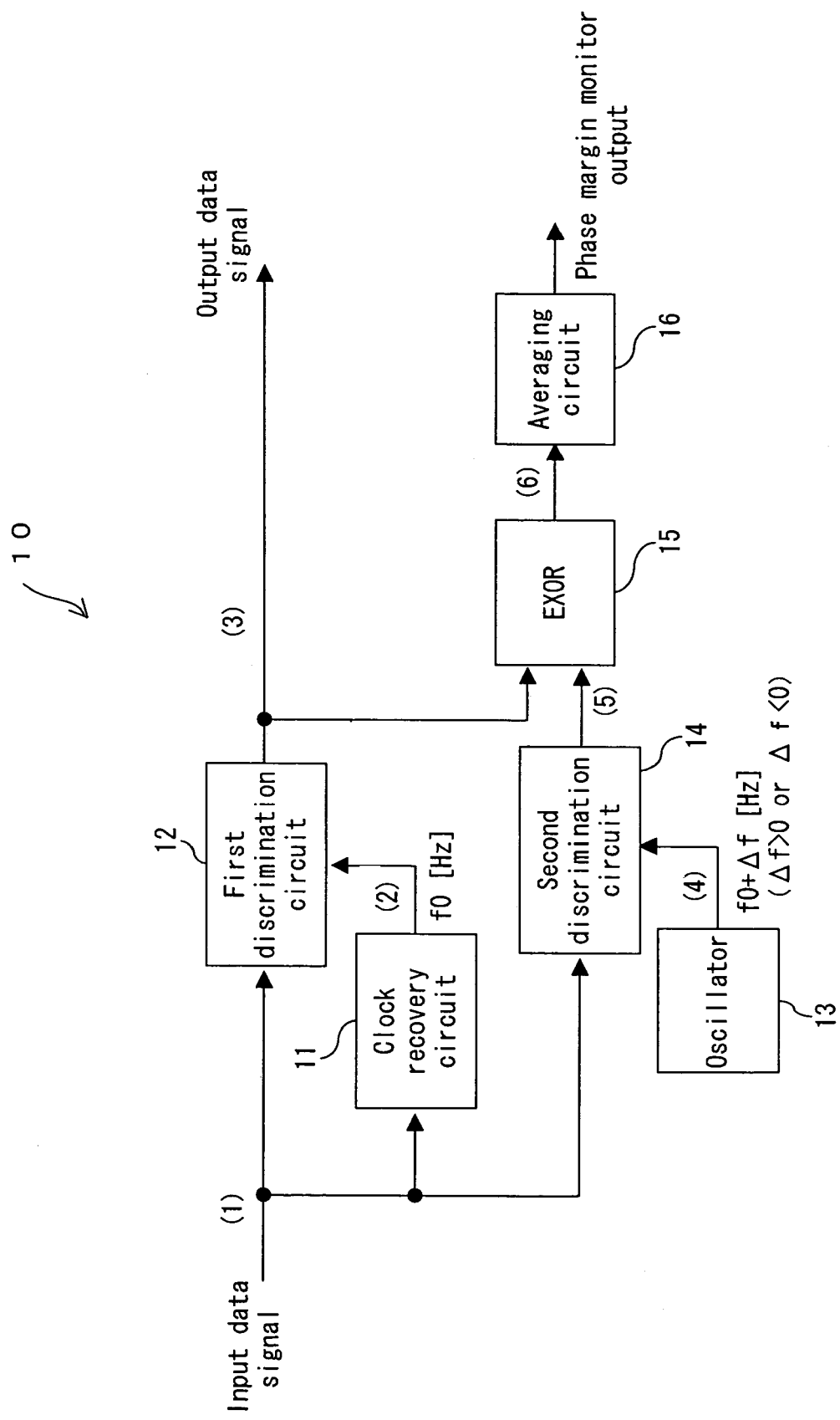
F I G. 1

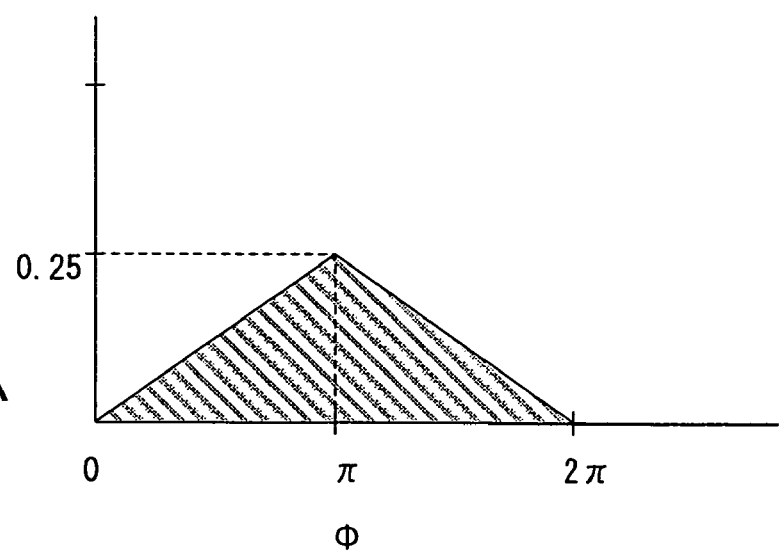
F I G. 4 A
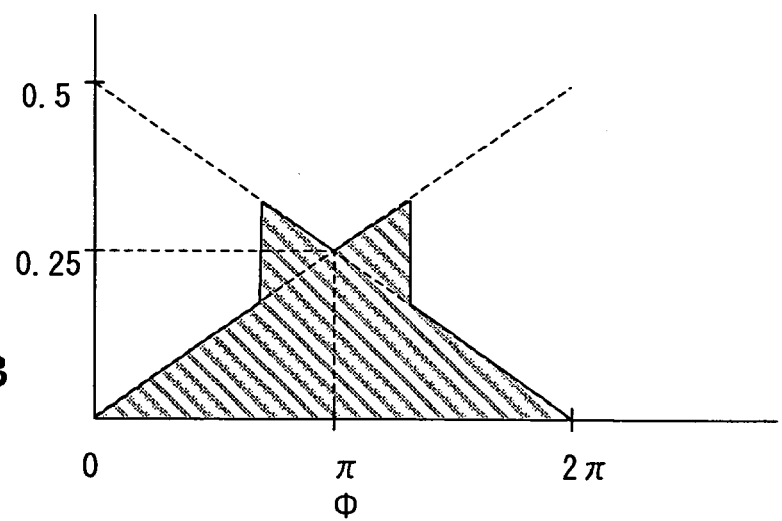
F I G. 4 B
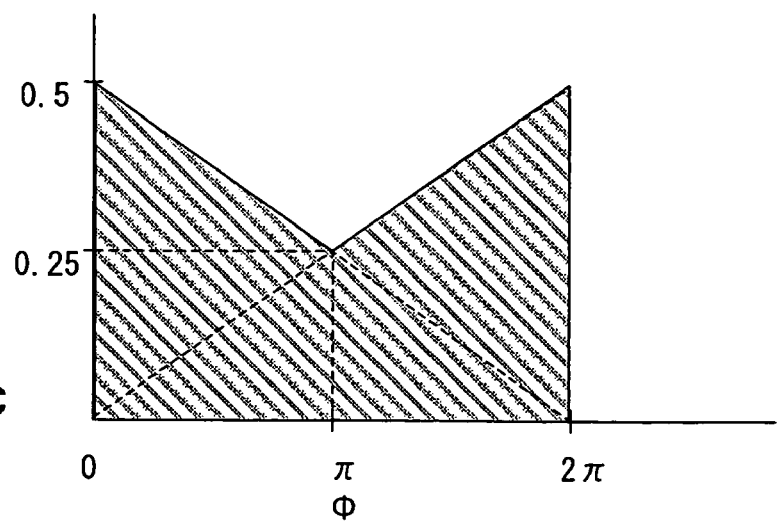
F I G. 4 C

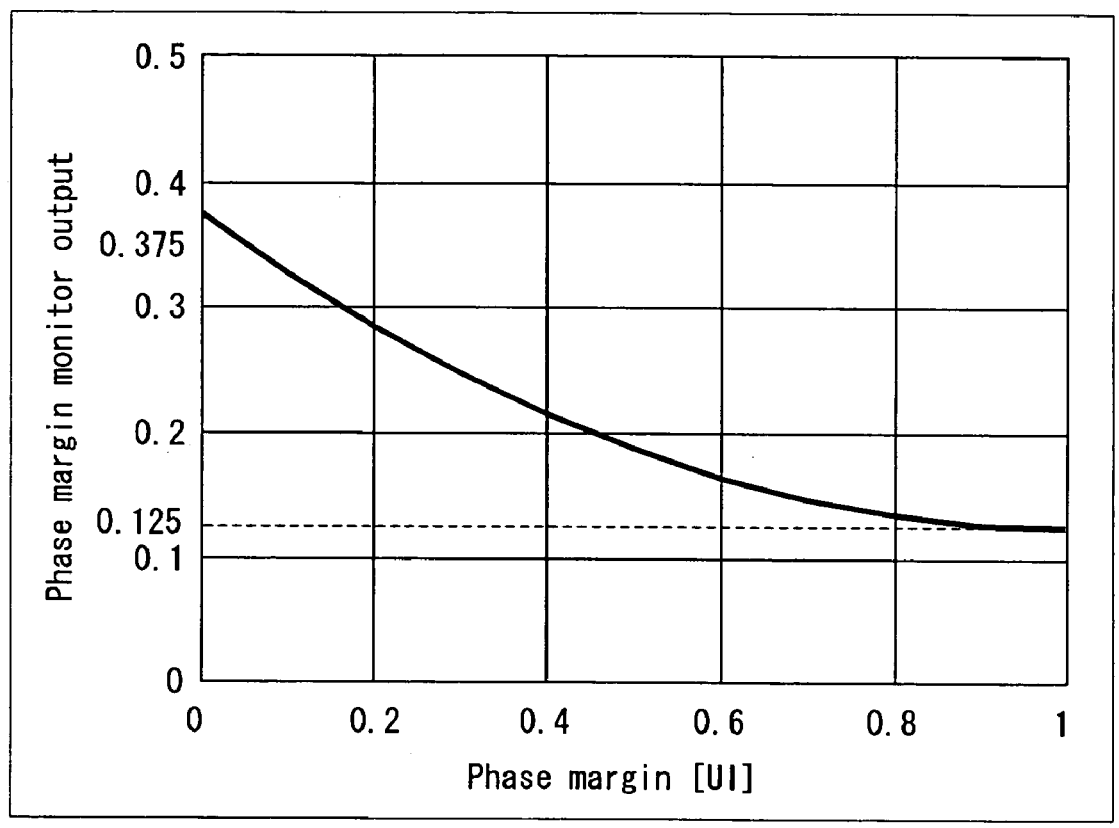
F I G. 5

DISCRIMINATION PHASE MARGIN MONITOR CIRCUIT, TRANSMITTING/RECEIVING DEVICE AND COMMUNICATION SYSTEM

BACKGROUND OF THE INVENTION

1. Field of the Invention

The present invention relates to a technology for suppressing the reproduction error of a transmission signal, and more particularly relates a technology for suppressing the reproduction error of a transmission signal in high-speed communication.

2. Description of the Related Art

Lately the transfer rate of data in a communication system has remarkably increased, and in a transmission line using an optical fiber, a transfer rate of approximately 10 Gb/s has been realized.

Generally, when receiving an optical signal transmitted from the optical transmitting device of the communication system, the receiving device of a communication system, such as the optical receiving device of an optical communication system using the above-mentioned optical fiber as a transmission medium converts the optical transmission signal into an electrical signal, reshapes the waveform of the electrical signal by a built-in equalizer and identifies data put on the output signal.

This data is identified by discrimination circuit built in the receiving device, based on both discrimination phase that is determined using a clock signal extracted from the output signal and a threshold voltage of "0" and "1" (hereinafter called "discrimination level or "discrimination voltage", and a set of the discrimination phase and discrimination level is called "discrimination point"). Thus, the data put on the output signal is reproduced.

However, the optical transmission waveform of an optical transmission signal that travels through the above-mentioned optical fiber deforms by the influences of noise, the transmission characteristic of an optical fiber and the like before the signal reaches the receiving device. Therefore, if the signal is reproduced by the built-in discrimination circuit in which a discrimination point is preset, in the optical receiving device receiving the signal, there occurs a deviation between the discrimination point and the optimal discrimination point of this case, and reproduction errors continue to occur.

As a method for visualizing this waveform deformation phenomenon, a method for displaying an eye pattern is known. This eye pattern can be formed by repeatedly overlapping a signal synchronous with a clock signal timewise using a measurement instrument, such as oscilloscope on the like. If a signal is outputted from the above-mentioned equalizer circuit, an eye pattern in which "mark" and "space" are overlapped is formed on a display screen in which time and current/voltage are taken on the horizontal and vertical axes, respectively, by repeatedly overlapping the output signal synchronous with a clock signal extracted the output signal timewise. Thus, coordinates (discrimination point) to be determined by both a predetermined value (discrimination phase) on the time axis and a predetermined value (discrimination level) on the current/voltage axis can be plotted on the eye pattern.

If waveform deformation occurs, the outline of the eye pattern becomes thick a little (shape obtained by overlapping a continuous signal waveform timewise), and a boundary between adjacent signal waveforms becomes vague. As a result, an eye opening becomes narrow and a valid discrimination area (range of discrimination points where "1" and "0" can be satisfactorily discriminated) also becomes narrow. Although there are a variety of waveform deformations, for example, sometimes the top of a waveform deforms and sometimes its bottom deforms, the allowable valid range (phase margin) of a discrimination phase in the time-axis direction for each unit in the current/voltage-axis direction on the eye pattern varies as time elapses. Usually, the phase margin is maximized at a cross-point between the "mark" waveform of the eye pattern and its "space" waveform, and the phase margin decreases as the signal shifts toward the top or bottom of the waveform using the point as a center. An optimal point where a discrimination error is hardest to occur in the valid discrimination area also shifts depending on the type of waveform deformation. This shift of an optimal point similarly occurs if a transmitted signal shifts in the current/voltage-axis direction.

As described above, if a waveform deformation phenomenon occurs, a point on the current/voltage axis where the phase margin is maximized is shifted in the current/voltage-axis direction. Therefore, in order to satisfactorily discriminate "1" from "0", it is important to detect an optimal discrimination level where the phase margin is maximized.

In order to cope with this waveform deformation, technologies for dynamically shifting the discrimination point to an optimal point are disclosed.

In one of such technologies, two discrimination circuits in which the discrimination point is deviated vertically (in the current/voltage-axis direction) or horizontally (in the time-axis direction) from the reference position are provided against a discrimination circuit with the reference discrimination point, and the reference discrimination point (discrimination level in the current/voltage-axis direction or discrimination phase in the time-axis direction) is independently shifted to an optimal position, based on the respective operation results of the reference discrimination circuit and each of the discrimination circuits. Especially, when adjusting the discrimination level to an optimal position, a common discrimination phase is given to each discrimination circuit by inputting the same clock signal to all the discrimination circuits, and the discrimination level is optimized on the same conditions in the time-axis direction. When adjusting the discrimination phase to an optimal position, a common discrimination level is given to all the discrimination circuits, and the discrimination phase is optimized on the same conditions in the current/voltage-axis direction. In this case, each discrimination circuit obtains a result using a clock signal with the reference phase that is based on a clock signal made recovery from a timing recovery unit, a clock signal with a phase advanced from the reference phase and a clock signal with a phase delayed from the reference phase. Then, the phase of the clock signal is changed so that the discrimination phase of the reference discrimination circuit may come to an optimal position, based on these results (Japanese Patent Laid-open Application No. 8-265375).

In another of the technologies, both a discrimination circuit discriminating an input data signal using a clock signal with a specific reference phase and a discrimination circuit discriminating the input data signal using a clock signal phase-modulated using the reference phase as the center are provided, the phase of the clock signal is changed based on the respective operation results of the outputs of these discrimination circuits and the discrimination point is shifted to an optimal point (Japanese Patent Laid-open Application No. 11-68674).

When reproducing signals transmitted from the transmitting device in the receiving device, a waveform deformation phenomenon in a transmission route is conventionally a problem.

Among a variety of communication systems, in the case of an optical communication system for transmitting optical transmission signals using the above-mentioned optical fiber as a transmission medium, optical transmission waveform deformation by the influences of noise, the transmission characteristic of an optical fiber and the like remarkably appears and greatly affects the reproduction of optical transmission signals. More particularly, in a high-speed optical communication system whose transfer rate exceeds, for example, 40 Gb/s, optical transmission waveform degrades by the influences of the dispersion characteristic/non-linearity of an optical fiber, the lack of a high-speed characteristic of an optical receiver circuit or the like, which raises a critical problem in the signal reproduction of an optical receiving device.

When solving the deviation problem of an optimal discrimination point due to this waveform degradation by the prior art, the highly accurate phase matching technology of a plurality of branched clock signals and a phase changing circuit for changing the phase of a clock signal with high accuracy are needed.

Nowadays, the promotion of integrated circuits is desired for the purpose of miniaturization. For example, if the transfer rate of a data signal is 40 Gb/s, one timeslot is 25 ps and is very short. Therefore, according to the prior art, phase matching with accuracy in order of 1 ps is needed.

In order to receive transmission signals with less waveform deformation in a receiving device, further the stabilization of transmission signals transmitted from a transmitting device is studied.

SUMMARY OF THE INVENTION

It is an object of the present invention to provide a discrimination phase margin monitor circuit for monitoring the phase margin of an eye pattern. The discrimination phase margin monitor circuit comprises a first discrimination circuit discriminating input data signal using a clock signal extracted from the input data signal, a second discrimination circuit discriminating the input data signal using a clock signal with a frequency different from that of the clock signal, and an operation circuit calculating the exclusive OR of the output signal of the first discrimination circuit and that of the second discrimination circuit and obtaining a phase margin monitor output signal by averaging the results.

BRIEF DESCRIPTION OF THE DRAWINGS

FIG. 1 is a block diagram showing the discrimination phase margin monitor circuit in the preferred embodiment of the present invention;

FIGS. 4A, 4B and 4C explain the output value of an averaging circuit that varies with the phase margin of an input data signal;

FIG. 5 is a graph showing the relationship between a phase margin and a phase margin monitor output value;

DESCRIPTION OF THE PREFERRED EMBODIMENTS

Figure 2:
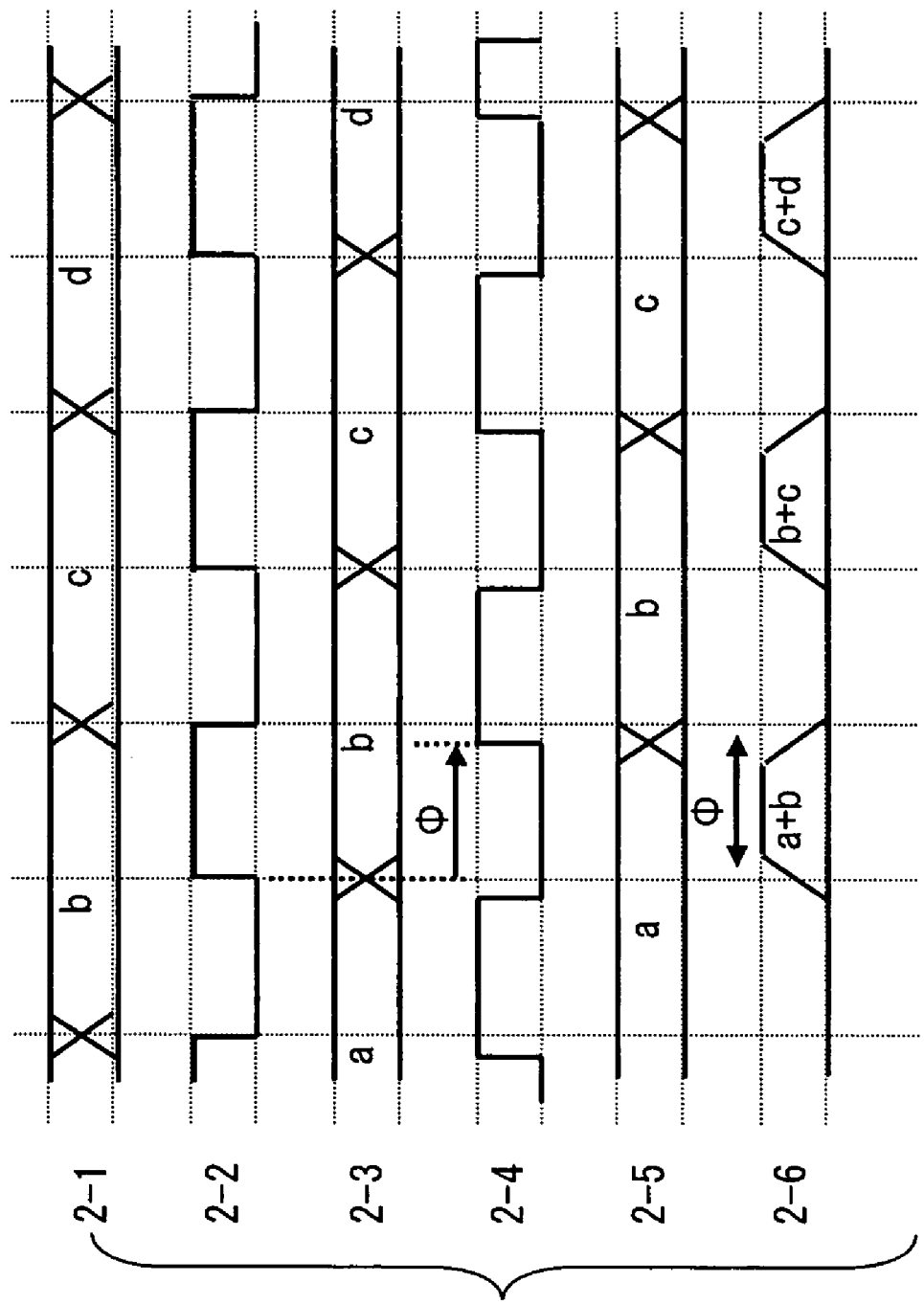
FIG. 2 is a timing chart used when the phase margin of an input data signal (1) is sufficiently wide.

One aspect of the discrimination phase margin monitor circuit of the present invention comprises a first discrimination circuit discriminating an input data signal using a clock signal extracted from the input data signal, a second discrimination circuit discriminating the input data signal using a clock signal with a frequency different from that of the clock signal, and an operation circuit calculating an exclusive OR of the output signal of the first discrimination circuit and that of the second discrimination circuit and obtaining a phase margin monitor output signal by averaging the results.

It is preferable for the reciprocal of the absolute value of a frequency difference between the two clock signals to be smaller than the time constant of the averaging circuit.

One aspect of the discrimination level optimization circuit of the present invention comprises the discrimination phase margin monitor circuit, and a discrimination level setting circuit setting the discrimination level of the first discrimination circuit, based on a phase margin monitor output signal.

It is preferable for the discrimination level setting circuit to set the discrimination level in such a way that the phase margin of the input data signal may become a maximum.

One aspect of the receiving device of the present invention comprises a light receiving device converting an optical transmission signal that travels through an optical fiber into an electrical signal, an equalizer circuit reshaping the waveform of the electrical signal converted by the light receiving device, and the discrimination level optimization circuit whose input data signal is a signal outputted from the equalizer circuit.

The cross-point optimization circuit of the present invention comprises a cross-point changing circuit outputting a data signal by changing the cross-point of the input data signal (the cross-point is a voltage value at a point where waveforms intersect with each other when displaying an input data signal waveform using an eye pattern), the discrimination phase margin monitor circuit whose input data signal is the output data signal of the cross-point changing circuit, and a cross-point setting circuit monitoring the phase margin monitor output signal and controlling the cross-point changing circuit so that the phase margin of the output data signal may become a maximum.

It is preferable for the cross-point setting circuit to control the cross-point changing circuit so that the cross-point of the output data signal may coincide with a discrimination level set in the first discrimination circuit.

Alternatively, the discrimination level of the first discrimination circuit can be adjusted.

One aspect of the transmitting device of the present invention comprises the cross-point optimization circuit, and an optical modulation circuit optically modulating a signal using an output data signal outputted from the cross-point changing circuit as a driving signal and transmitting the optically modulated signal to an optical fiber.

Alternatively, the transmitting device can comprise a light receiving device converting the optically modulated signal that travels through the optical fiber into an electrical signal, and an amplifier circuit amplifying the electrical signal converted by the light receiving device. In this case, the input data signal of the discrimination phase margin monitor circuit is the signal outputted from the amplifier circuit.

One aspect of the optical multiplex signal transmitting device of the present invention comprises a plurality of the transmitting devices, and an optical multiplexer multiplexing optical signals outputted from each transmitting device and transmitting the multiplex signal to an optical fiber.

The optical multiplex signal receiving device of the present invention comprises a plurality of the receiving devices, and a demultiplexer demultiplexing an optical multiplex signal transmitted from an optical fiber. The optical multiplex signal receiving device separately discriminates each signal demultiplexed by the demultiplexer.

One aspect of the optical communication system of the present invention comprises the optical multiplex signal transmitting device and optical multiplex signal receiving device.

In the present invention, when discriminating an input data signal by the first discrimination circuit, the second discrimination circuit discriminates the input data signal using a clock signal with a frequency different from that of a clock signal used for the discrimination by the first discrimination circuit. Then, the exclusive OR of the respective output signals of the two discrimination circuits are calculated and averaged. Thus, as a phase margin increases, the average value decreases, and reaches a predetermined value (minimum value).

Therefore, if the average is monitored and, for example, the discrimination level of the first discrimination circuit is changed so that the value may become a minimum, the discrimination of the first discrimination circuit can be conducted at a point where the phase margin becomes a maximum.

Thus, the phase margin of the eye pattern can be monitored without highly accurate phase matching, and furthermore, the reproduction error of a receiving data signal can be greatly reduced by monitoring the phase margin.

The best mode for carrying out the present invention is described in detail below with reference to the drawings.

FIG. 1 is a block diagram showing the discrimination phase margin monitor circuit in the preferred embodiment of the present invention.

The discrimination phase margin monitor circuit 10 shown in FIG. 1 comprises a clock recovery circuit 11, a first discrimination circuit 12, an oscillator 13, a second discrimination circuit 14, an exclusive OR (EXOR) circuit 15 and an averaging circuit 16.

The clock recovery circuit 11 extracts a clock signal (hereinafter called "first clock signal", frequency=f0 Hz) from an input data signal (1), and inputs the first clock signal (2) to the first discrimination circuit 12.

The first discrimination circuit 12 discriminates the input data signal (1), based on both a discrimination phase determined by the first clock signal extracted by the clock recovery circuit 11 and a discrimination level (variable or fixed discrimination level) currently set in the first discrimination circuit 12, and generates an output data signal (3).

The oscillator 13 oscillates a second clock signal (frequency=f0+Δf Hz, and when taking the frequency stability of the oscillator 13 into consideration, 1/|Δf|<time constant of an averaging circuit, which is described later) with a frequency different from that of the first clock signal (1), and inputs the oscillated second clock signal (4) to the second discrimination circuit 14.

The second discrimination circuit 14 discriminates the input data signal (1), based on both a discrimination phase determined by the second clock signal of the oscillator 13 and the fixed discrimination level of the second discrimination circuit 14, and generates an output data signal (5).

The EXOR circuit 15 calculates the EXOR of the output signal (3) of the first discrimination circuit 12 and the output signal (5) of the second discrimination circuit 14.

The averaging circuit 16 averages the output signals (6) of the EXOR circuit 15. In this circuit configuration, a phase margin displayed on the eye pattern of the input data signal (1) is monitored based on the output value of the averaging circuit 16, using clock signals each with a different frequency (the first and second clock signals).

While watching the output value that varies with the phase margin, in the receiving device, a discrimination level in the first discrimination circuit 12 is adjusted to an optimal value. In the transmitting device, the input data signal (1) is adjusted in such a way that the location of the cross-point of the input data signal (1) may coincide with that of a cross-point set in the first discrimination circuit 12.

Figure 3:
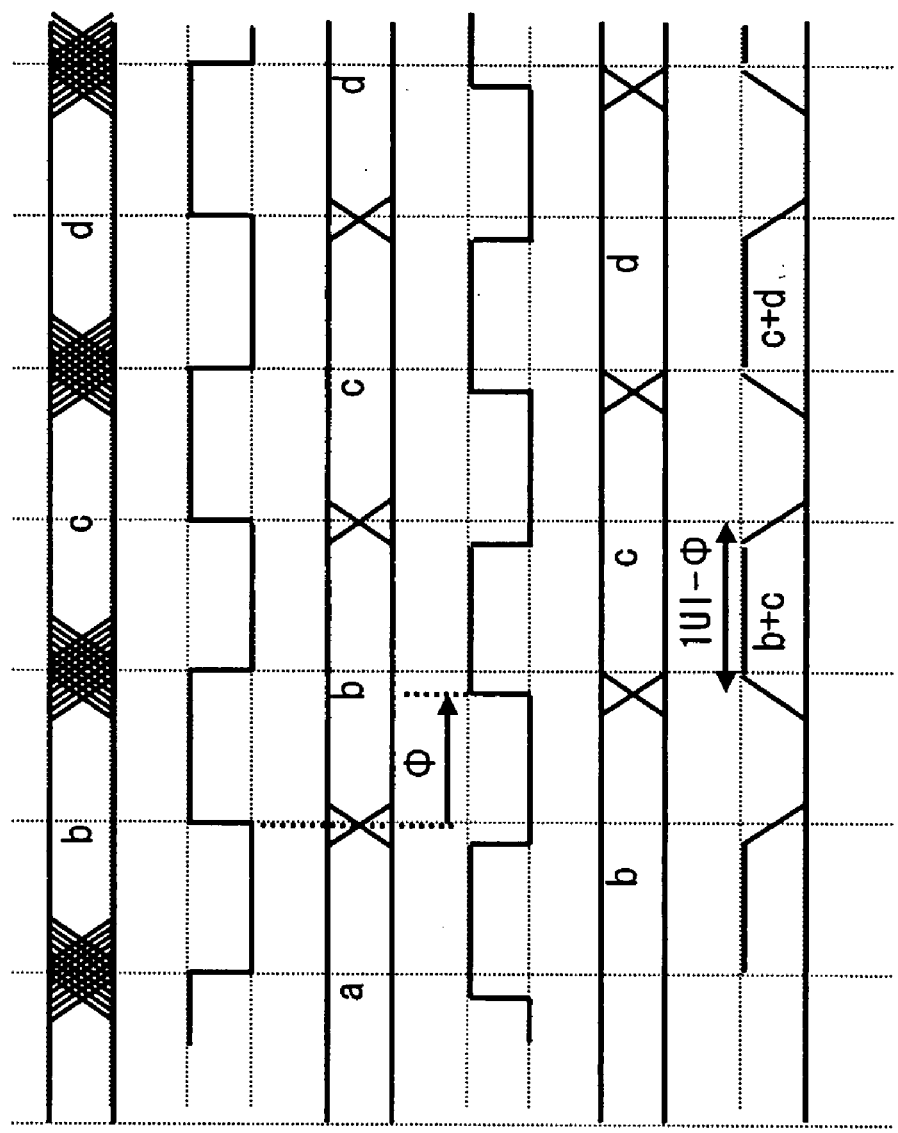
FIG. 3 is a timing chart used when the phase margin of an input data signal (1) is sufficiently narrow.

FIG. 2 is a timing chart showing the case where the phase margin of the input data signal (1) shown in FIG. 1 is sufficiently wide (in the case of a good signal). FIG. 3 is a timing chart showing the case where the phase margin of the input data signal (1) is sufficiently narrow (in the case of a signal with deformed waveform) In each drawing, timing charts (2-1~2-6 or 3-1~3-6) are shown in the order of a variety of signals (1) through (6) of FIG. 1. As described above, the frequency of the first clock signal (2) differs from that of the second clock signal (4) by Δf (in this case Δf>0). If the frequency of the first clock signal is the same as that of the second clock signal, the second clock signal (4) will be able to be replaced with a signal whose phase repeatedly changes from −π rad to π rad in a cycle of 1/|Δf| against the first clock signal (2). Therefore, in each drawing, the phase of the second clock signal (4) is displayed deviated from the first clock signal (2) by a phase Φ.

Firstly, the timing chart shown in FIG. 2 is described.

When discriminating an input data signal 2-1 with a wide-phase margin using the first clock signal 2-2, an output 2-3 can be obtained.

When discriminating an input data signal 2-1 with a wide-phase margin using the second clock signal 2-4, an output 2-5 can be obtained.

Then, when calculating the EXOR of outputs 2-3 and 2-5, an output signal 2-6 with a pulse width determined by the phase Φ difference can be obtained.

Then, when discriminating an input data 3-1 with a frequency narrower than that of the phase margin shown in FIG. 2 using the first clock signal 3-2, an output signal 3-3 can be obtained. In this example, the same result as the output signal 2-3, which has been described in FIG. 2, can be obtained for convenience' sake.

However, when discriminating an input data signal using the second clock signal 3-4, an output 3-5 can be obtained. In this example, the second clock signal 3-4 is located in the vicinity of the change point of the input data signal 3-1. Therefore, if as shown in FIG. 3, a phase margin is narrow due to the deformation of a transmission waveform, the output 3-5 sometimes becomes deviated by one bit.

Therefore, if the EXOR of the output signals 3-3 and 3-5 is calculated, as shown in 3-6, an output signal with a pulse width determined by 1[UI (unit Interval) (1UI=one cycle of a bit clock))]−Φ can be obtained. In other words, compared with the case of a wide phase margin, in the case of a narrow phase margin, the pulse width of an output signal after the EXOR calculation becomes wide.

Thus, if the phase of the second clock signal (4) changes from −π to π rad in the cycle of 1/|Δf|, against the first clock signal (2), at each time point within the range of the phase margin, an output signal with a pulse width determined by the phase Φ difference can be obtained from the EXOR circuit 15, as shown in FIG. 2. Then, at each time point out of the range of the phase margin (in the vicinity of the boundary of an input data signal in the case of a deformed transmission waveform), an output signal with a pulse width determined by 1[UI]−Φ (pulse width wider than that determined by Φ) can be obtained from the EXOR circuit 15, as shown in FIG. 3.

FIGS. 4A, 4B and 4C explain the output value of an averaging circuit (also called "phase margin monitor output value) that varies with the phase margin of an input data signal.

In these examples, description is made assuming that the low and high levels of the output signal 2-6 shown in FIG. 2 and output signal 3-6 shown in FIG. 3 are 0 and 1, respectively. A mark ratio is 1/2. In FIG. 4, a phase Φ is changed from 0 up to 2π so that a change due to the narrowing of a phase margin can be easily understood.

FIG. 4A is the output calculation chart of the averaging circuit in the case of a wide phase margin (state shown in FIG. 2).

In this example, since a phase margin is 1[UI] and wide, there occurs no bit deviation even if phase Φ changes from 0 up to 2π.

Therefore, if phase Φ changes from 0 up to π, the output value of the averaging circuit increases in proportion to a pulse width determined by phase Φ, the output value reaches 0.25 at phase π. If phase Φ changes from π up to 2π, the output value decreases and reaches 0 at 2π. In this case, the average value (phase margin monitor value) becomes 0.125.

FIG. 4B is the output calculation chart of the averaging circuit in the case of a narrow phase margin (state shown in FIG. 3).

If the waveform of an input data signal deforms and a phase margin becomes narrow, a pulse width expands to a pulse width determined by 1−Φ in the vicinity of the change point of an input data signal. Therefore, a plotted area increases in the expanded range, as shown in FIG. 4B. In this case, the average value (phase margin monitor output value) is 0.125.

FIG. 4C is the output calculation chart of the averaging circuit in the case of no phase margin (a phase margin is 0[UI]).

If a phase margin becomes 0[UI], a pulse width expands in the entire range where phase Φ changes from 0 up to 2π. Therefore, the expanded range of the pulse width shown in FIG. 4B is expanded from 0 up to 2π, and the plotted area increases across the entire range. In this case, the average value (phase margin monitor output value) becomes a maximum value 0.375.

In this preferred embodiment, as described above, the following relationship holds true.

Time constant of averaging circuit>1/|Δf| This is made in order to prolong an integration period and to detect the change in expansion of a pulse width in the case of a narrow phase margin. Thus, the expansion of an area in the direction of slanting broken lines in FIG. 4C can be suppressed up to the state shown in FIG. 4C using Φ=π shown in FIG. 4B as a center. The averaging circuit 16 averages outputs across a period, for example, when time of 1/Δf corresponding to 0 to 2π elapses.

The timing charts shown in FIGS. 2 and 3 show the timing of phase Φ difference in a part of this period.

FIG. 5 is a graph showing the relationship between each phase margin and the output value of the averaging circuit for each phase margin (phase margin monitor output value) obtained when applying the calculation in FIGS. 4A, 4B and 4C to a margin phase from 0{UI} up to 1[UI].

As shown in FIG. 5, in the graph, as a phase margin increases, the phase margin monitor output value decreases. The maximum output value obtained when a phase margin is 0[UI] is 0.375. The output value gradually decreases toward an asymptote that passes through an output value 0.125 obtained when the phase margin is 1[UI], and reaches 0.125.

In the descriptions in FIGS. 2 through 5, it is assumed that Δf>0. If Δf<0, the direction in which the second clock signal changes against the first clock signal is the reversal. However, the same result of the averaging circuit as obtained if Δf>0 can be obtained.

If in the phase margin monitor circuit 10 shown in FIG. 1, the cross-point of an input data signal (1) and a mechanism for relatively changing the discrimination level of the input data signal in the current/voltage axis direction where the phase margin of the input data signal (1) are combined, a discrimination level where the phase margin monitor output value becomes a minimum or the location of the cross-point can be detected by monitoring a signal outputted from the averaging circuit, and an optimal point where the phase margin becomes a maximum can be set.

According to such a configuration, there is no need for highly accurate phase matching only if two clock signals each with a different frequency are used.

Figure 6:
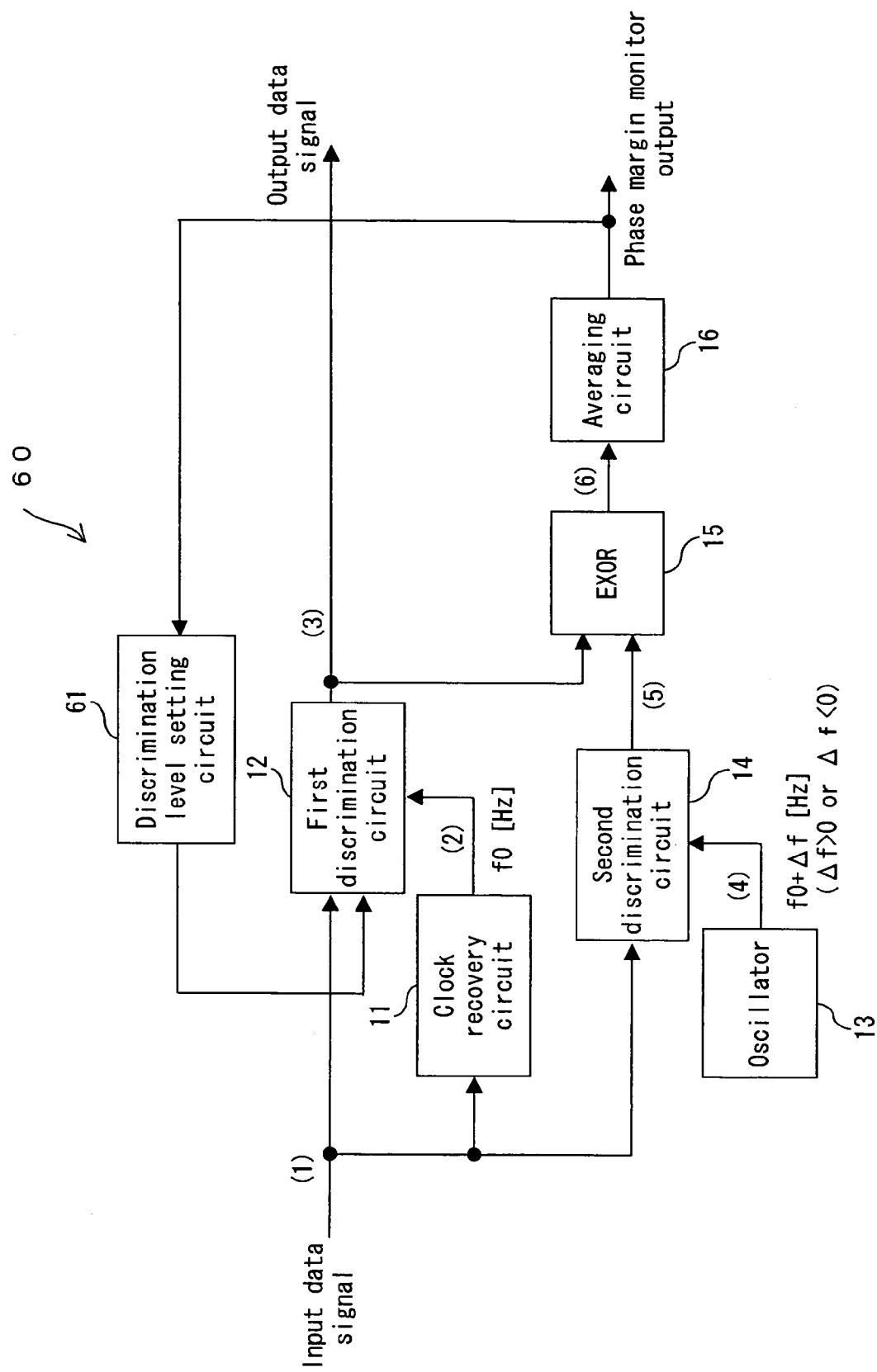
FIG. 6 is a block diagram showing discrimination level optimization circuit.

FIG. 6 is a block diagram showing discrimination level optimization circuit adopting the phase margin monitor circuit. In FIG. 6, the same reference numerals as those in FIG. 1 are attached to the same components.

This discrimination level optimization circuit 60 is obtained by newly adding a discrimination level setting circuit 61 to the phase margin monitor circuit shown in FIG. 1.

The discrimination level setting circuit 61 sets the discrimination level of the first discrimination circuit. As shown in FIG. 6, the discrimination level setting circuit 61 inputs a phase margin monitor output from its input terminal, gradually adjusts the discrimination level of the first discrimination level in such away that a phase margin monitor output value may become a minimum, based on the phase margin monitor output inputted then, and lastly sets an optimal discrimination level in the first discrimination circuit 12.

Figure 7:
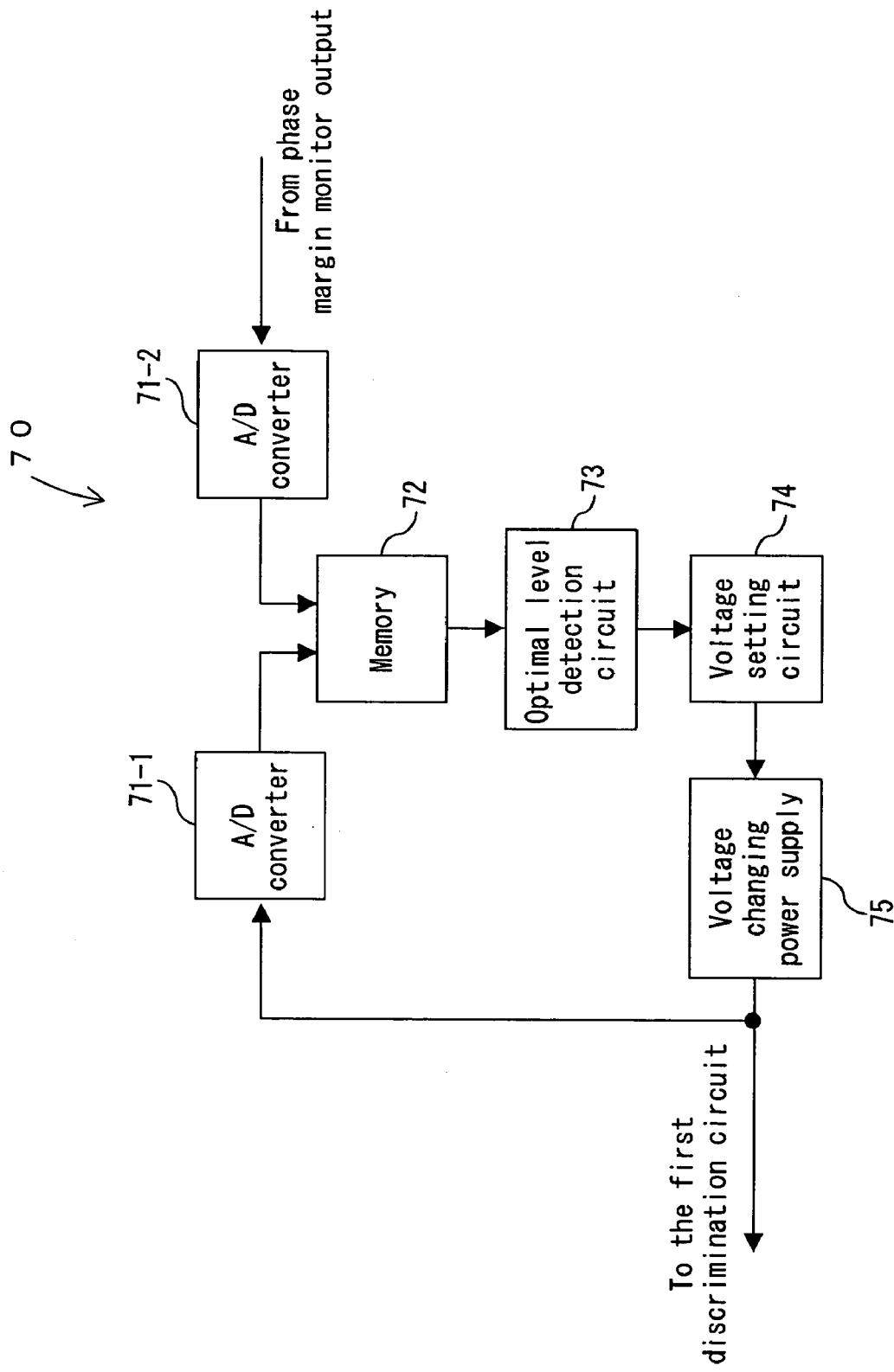
FIG. 7 shows an example of the configuration of a discrimination level setting circuit used when extracting the optimal point of the discrimination level by digital processing.
Figure 8:
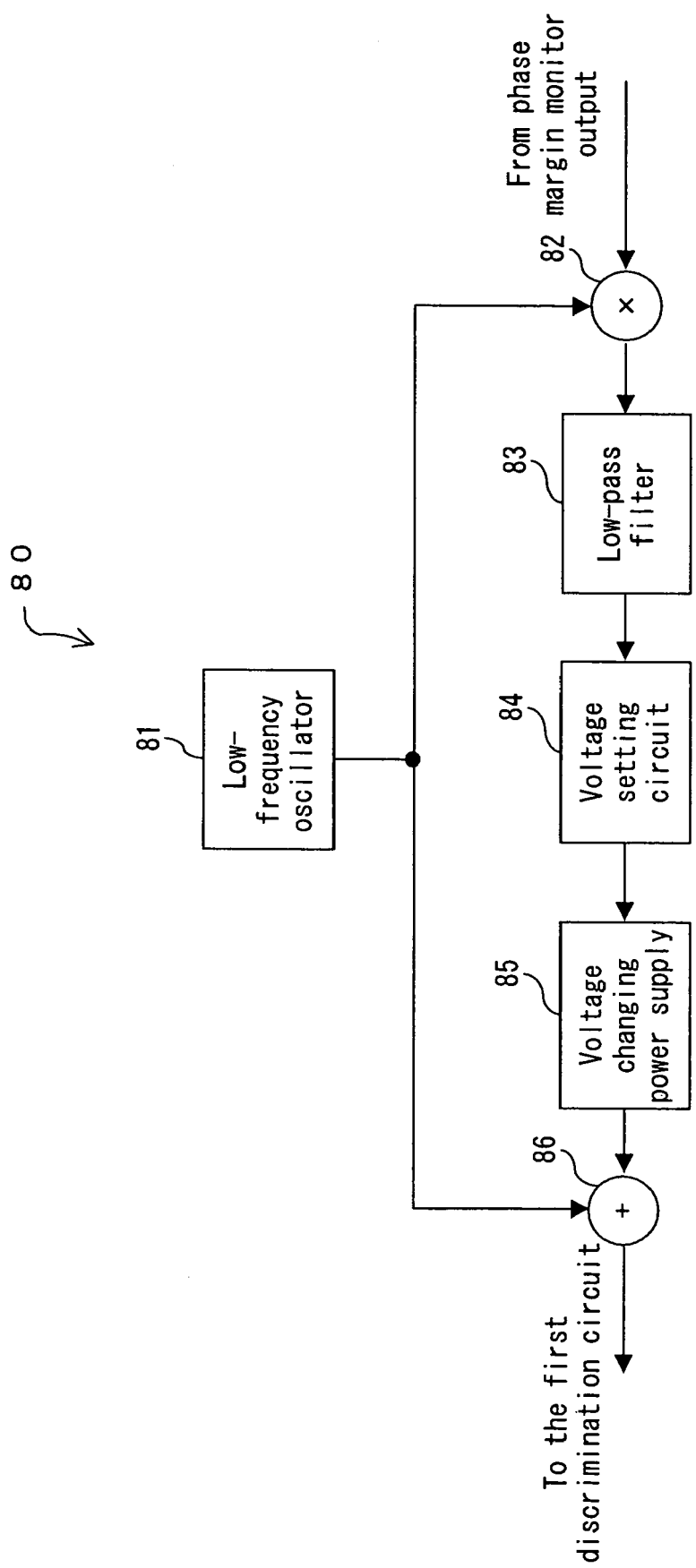
FIG. 8 shows an example of the configuration of a discrimination level setting circuit used when extracting the optimal point of the discrimination level by analog processing.

FIGS. 7 and 8 are the block diagrams showing the configuration of the discrimination level setting circuit 61.

FIG. 7 shows an example of the configuration of a discrimination level setting circuit used when extracting the optimal point of the discrimination level by digital processing.

The discrimination level setting circuit 70 shown in FIG. 7 comprises A/D converters 71 (71-1 and 71-2), memory 72, an optimal level detection circuit 73, a voltage setting circuit 74 and a voltage changing power supply 75.

The A/D converter 71 converts the numerical value of a phase margin monitor output signal or voltage signal to be outputted to the first discrimination circuit 12.

The memory 72 relates the numerically converted phase margin monitor output value to the voltage level value and stores them.

The optimal level detection circuit 73 shifts the voltage level set in the memory 72 in the decreasing direction of the phase margin monitor output value that is related to the voltage level and stored, by a predetermined number of levels, sets the voltage level in the voltage setting circuit 74, and lastly sets the optimal value of the voltage level in the voltage setting circuit 74.

The voltage setting circuit 74 controls the voltage of the voltage changing power supply 75, based on a voltage designated by the optimal level detection circuit 73.

The voltage changing power supply 75 supplies the first discrimination circuit 12 with changed voltage signals.

This discrimination level setting circuit 70 shifts a voltage value initially set in the memory 72 in any direction by a predetermined number of levels and outputs a voltage signal with the shift destination voltage to the first discrimination circuit 12. Thus, a phase margin monitor output signal obtained by the setting of the voltage value and the voltage signal are inputted to the A/D converters 71-2 and 71-1, respectively, and the phase margin monitor output value and the voltage value of the voltage signal are related to each other and stored. By repeating this process, the optimal level detection circuit 73 detects the decreasing direction of the phase margin monitor output value, based on each value stored in the memory 72, shifts the voltage value in the detected direction, and lastly detects a voltage value at which the phase margin monitor output value becomes a minimum (optimal value of the discrimination level). Then, the voltage changing power supply 75 is controlled by this voltage value, and the voltage signal is supplied to the first discrimination circuit 12. In the first discrimination circuit 12, the discrimination level can be controlled based on this voltage value, and the discrimination level can be always adjusted to a position where the phase margin becomes a maximum.

FIG. 8 shows an example of the configuration of a discrimination level setting circuit used when extracting the optimal point of the discrimination level by analog processing.

The discrimination level setting circuit 80 shown in FIG. 8 comprises a low-frequency oscillator 81, a multiplier 82, a low-pass filter 83, a voltage setting circuit 84, a voltage changing power supply 85 and a an adder 86.

The phase margin monitor output signal is multiplied by a low-frequency signal outputted from the low-frequency oscillator 81 in the multiplier 82. The low-frequency signal is added to a signal outputted from the voltage changing power supply 85 to the discrimination circuit 12 in the adder 86.

The low-pass filter 83 limits the band of a signal outputted from the multiplier 82.

The voltage setting circuit 84 changes the voltage of the voltage changing power supply 85 in the increasing direction of the phase margin.

By adopting this configuration, a discrimination level to be set in the discrimination circuit 12 can be lastly converged to the upper peak value of the phase margin.

In the optimal point setting of a discrimination level described above, the discrimination level can be set to an optimal point without initially setting a predetermined discrimination level. If the discrimination level is higher than the high level of an input data signal or lower than its low level, the phase margin is 0. However, in this case, the phase margin monitor output value becomes 0.5, which is the average value of the output signals (5) of the second discrimination circuit 14. However, since as shown in FIG. 5, the phase margin monitor output value becomes smaller than 0.5, the optimal point of a discrimination level can be detected without initial setting, by controlling a discrimination level setting circuit so that the phase margin monitor output value may be a minimum.

Figure 9:
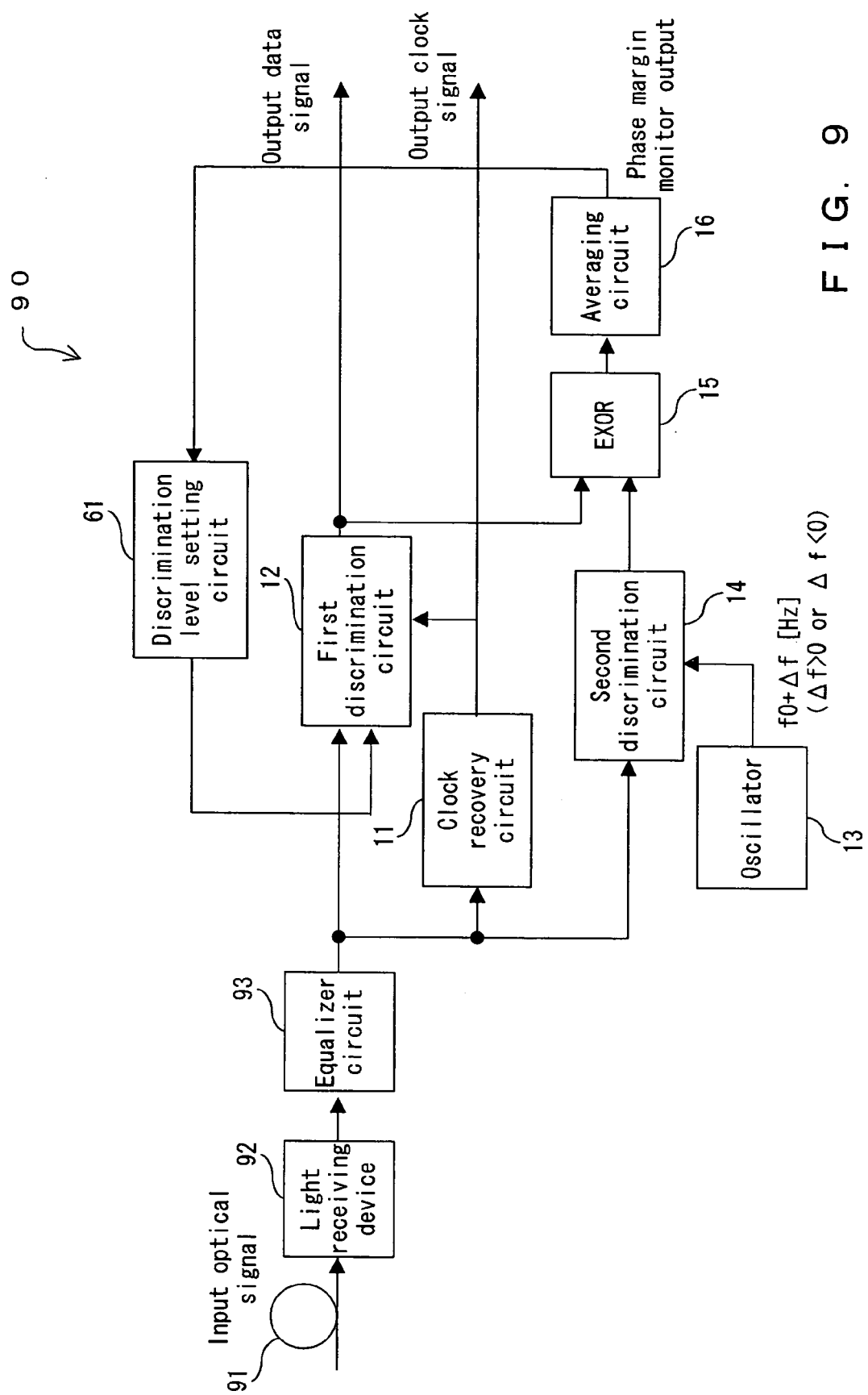
FIG. 9 shows an example of the configuration of the optical receiving device with the discrimination level optimization circuit 60 shown in FIG. 6.

FIG. 9 shows an example of the configuration of the optical receiving device with the discrimination level optimization circuit 60 shown in FIG. 6. In FIG. 9, the same reference numerals as those in FIG. 6 are attached to the same components.

The optical receiving device 90 shown in FIG. 9 converts an optical signal transmitted through an optical fiber 91 into an electrical signal by a light receiving device, such as a photo-diode or the like, and further reshapes its waveforms or limits the band of noise by an equalizer circuit 93, such as an equalizing filter or the like. Then, the discrimination level optimization control described above with reference to FIGS. 6 through 8 is exercised, whose description is omitted here to avoid the repetition of the same description.

By this optimization control, the discrimination level of the first discrimination circuit 12 for an optical signal transmitted through the optical fiber 91 can be adjusted to a discrimination level where the phase margin becomes a maximum, depending on the waveform degradation of the optical transmission signal. Then, at a discrimination point that is determined by both a discrimination phase determined by a clock timing extracted by a clock recovery circuit 11 and a discrimination level after the adjustment, it is determined whether the optical transmission signal is "1" or "0", and the determination result is outputted as data (output data signal). Then, both this output data signal and a clock signal extracted by the clock recovery circuit 11 (output clock signal) are transmitted to a succeeding device.

By applying this optimization control, an error rate (digital error rate) can be greatly reduced when discriminating optical transmission signals in a receiving device.

Figure 10:
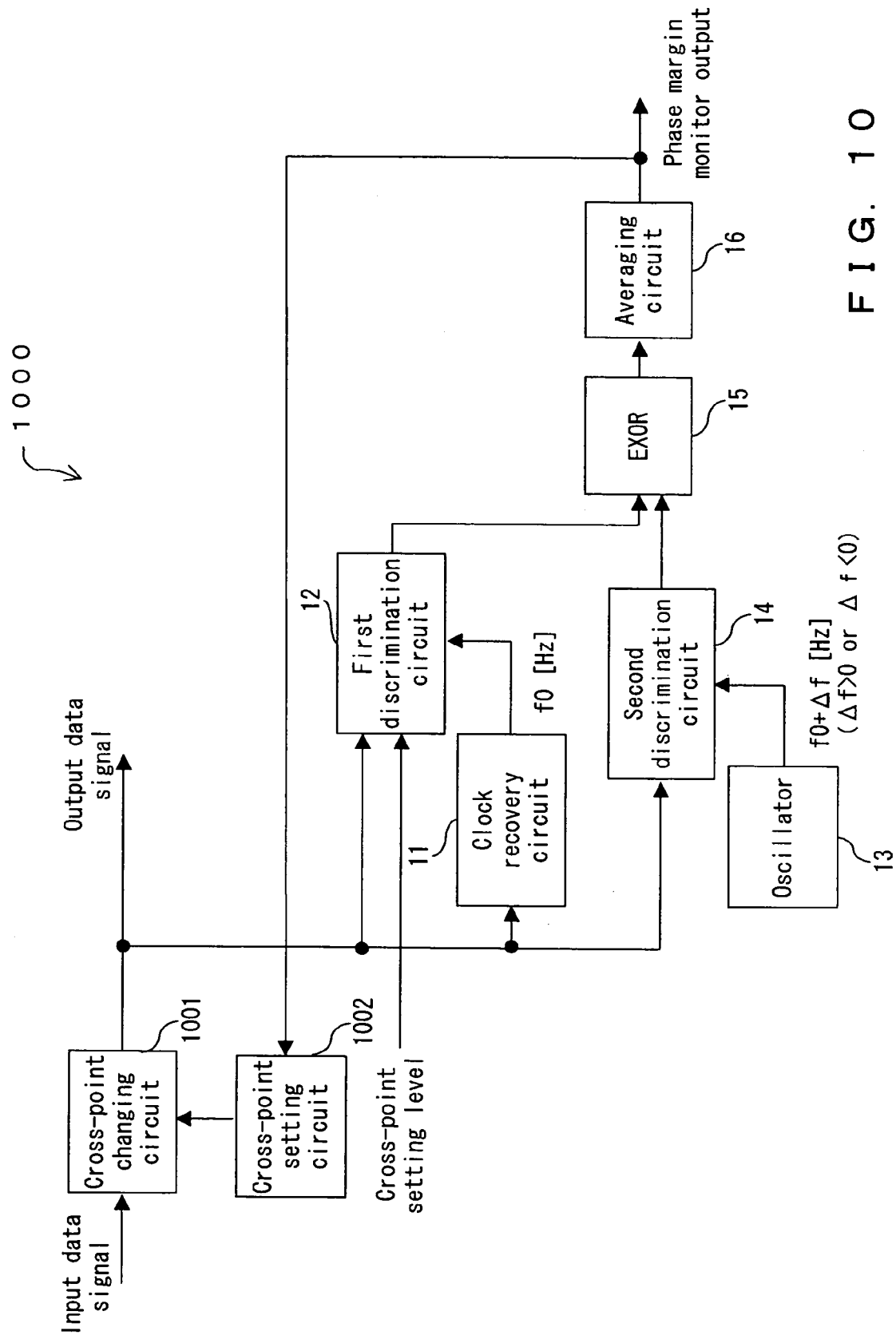
FIG. 10 is a block diagram showing a cross-point optimization circuit.

FIG. 10 is a block diagram showing a cross-point optimization circuit suitable for the phase margin monitor circuit 10 shown in FIG. 1. In FIG. 10, the same reference numerals as those in FIG. 1 are attached to the same components.

This cross-point optimization circuit 1000 can be obtained by adding a cross-point changing circuit 1001 and a cross-point setting circuit 1002 to the phase margin monitor circuit 10. Furthermore, a cross-point setting level is set in the first discrimination circuit 12.

The cross-point changing circuit 1001 inputs an input data signal from its input terminal, shifts the input data signal in the current/voltage axis direction in such a way that the cross-point of the input data signal is located at a cross-point designated by the cross-point setting circuit 1002, which is described later. Then, the cross-point changing circuit 1001 outputs the signal shifted in the current/voltage axis direction to a succeeding device as an output data signal, instead of the output data signal of the phase margin monitor circuit 10 described above with reference to FIG. 1. The output data signal is also inputted to the first discrimination circuit 12 composed of the phase margin monitor circuits 10.

The cross-point setting circuit 1002 inputs a phase margin monitor output signal outputted from an averaging circuit 16, from its input terminal, and transmits a signal in which the phase margin monitor output value becomes a minimum, to the cross-point changing circuit 1001 from its output terminal.

In this cross-point optimization circuit 1000, an input data signal is shifted in the current/voltage axis direction by the control of the cross-point changing circuit 1001 according to the instruction of the cross-point setting circuit 1002. The input data signal after the shift is inputted to the first discrimination circuit 12, and is discriminated based on both the discrimination phase of the clock timing extracted from the input data signal after the shift by the clock recovery circuit 11 and the discrimination level of a cross-point setting level (for example, a voltage value) set in the first discrimination circuit 12. In the second discrimination circuit 14, the input data signal after the shift is discriminated. Then, as described so far, a phase margin monitor signal is generated from these discrimination signals through both the EXOR circuit 15 and averaging circuit 16.

In this preferred embodiment, an input data signal is shifted in the current/voltage axis direction, instead of a discrimination level.

From the viewpoint of an input data signal, this is equivalent to the operation of the discrimination level optimization circuit changing a discrimination level.

Therefore, in the graph showing the relationship between a phase margin monitor output and a phase margin, as the phase margin approaches from 0[UI] to 1[UI], the phase margin monitor output value gradually approaches a predetermined phase margin monitor output value used when the phase margin is 1[UI]. Therefore, the phase margin monitor output value becomes a minimum when the location of a discrimination level becomes the same as that of a cross-point.

The cross-point setting circuit 1002 controls the cross-point changing circuit 1001 so as to minimize margin monitor output value, according to the operation principle described, for example, with reference to FIGS. 7 and 8. Then, lastly, an input data signal in which the position of a cross-point coincides with a cross-point setting level (voltage value) to be set in the first discrimination circuit 12 is outputted from the cross-point changing circuit 1001 as an output data signal. Usually, the cross-point setting level is set at the center. However, sometimes it is preferable for the cross-point setting level to vertically shift from the center, depending on an application point. Therefore, the cross-point setting level can be adjusted.

Figure 11:
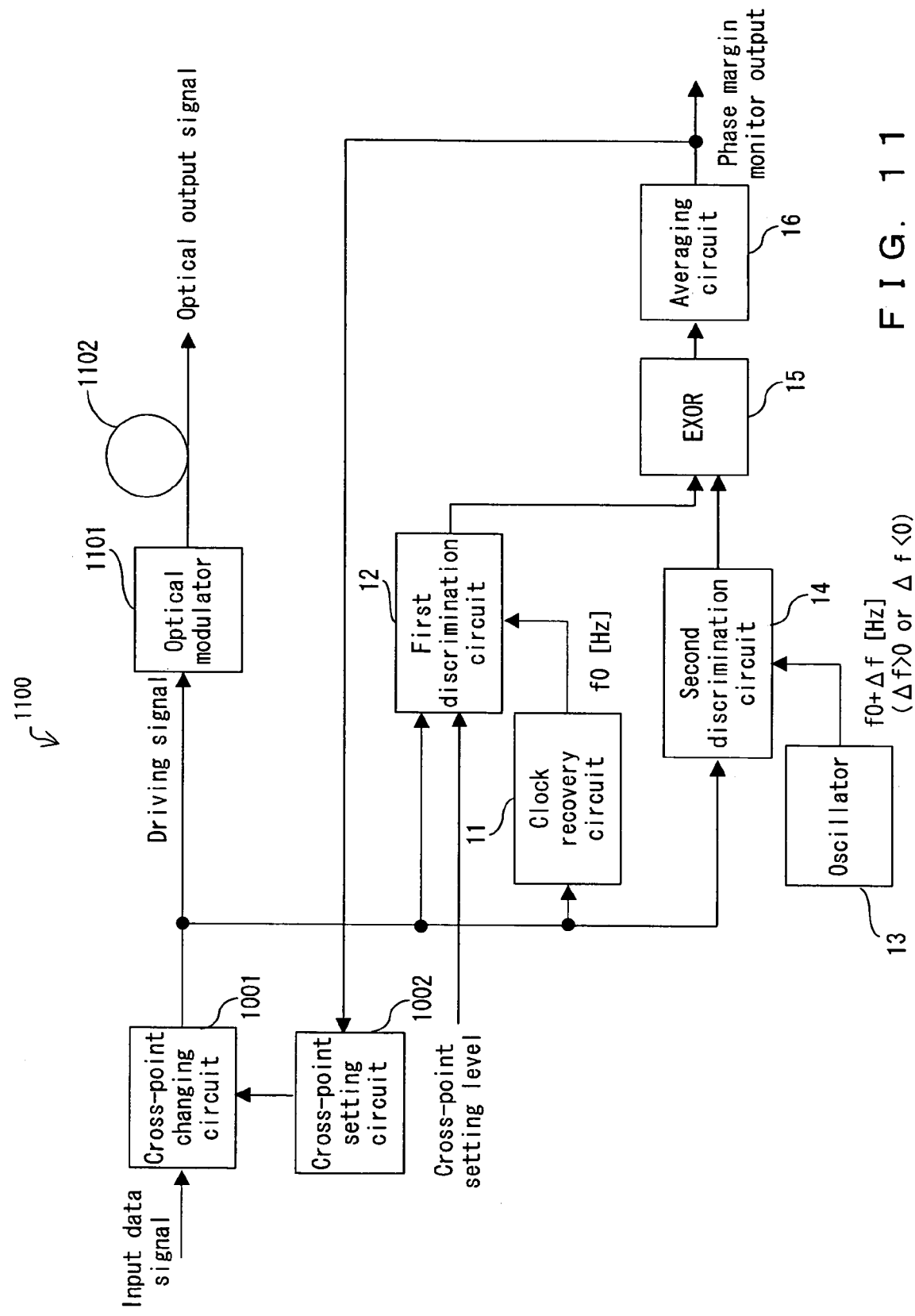
FIG. 11 shows an example of the configuration of the optical transmitting device with the cross-point optimization circuit 1000 shown in FIG. 10.

FIG. 11 shows an example of the configuration of the optical transmitting device with the cross-point optimization circuit 1000 shown in FIG. 10. In FIG. 11, the same reference numerals as those of FIG. 10 are attached to the same components.

In this preferred embodiment, if the modulation characteristic of an optical modulator is non-linear, the cross-point of a driving electrical waveform of the optical modulator is controlled so as to optimize an optical waveform outputted from the optical modulator.

The transmitter 1100 shown in FIG. 11 comprises an optical modulator 1101 modulating transmission signals, and an optical fiber 1102 carrying modulated signals. The optimization control by a driving signal of modulating an input data signal by the optical modulator 1101 is performed by the cross-point optimization circuit.

In this configuration, the phase margin monitor output value of the optical modulator 1101 is monitored, and the cross-point changing circuit is controlled so as to minimize the phase margin monitor output value. Thus, the cross-point of the driving signal can be accurately set to the position of the cross-point setting level set in the first discrimination level.

Figure 12:
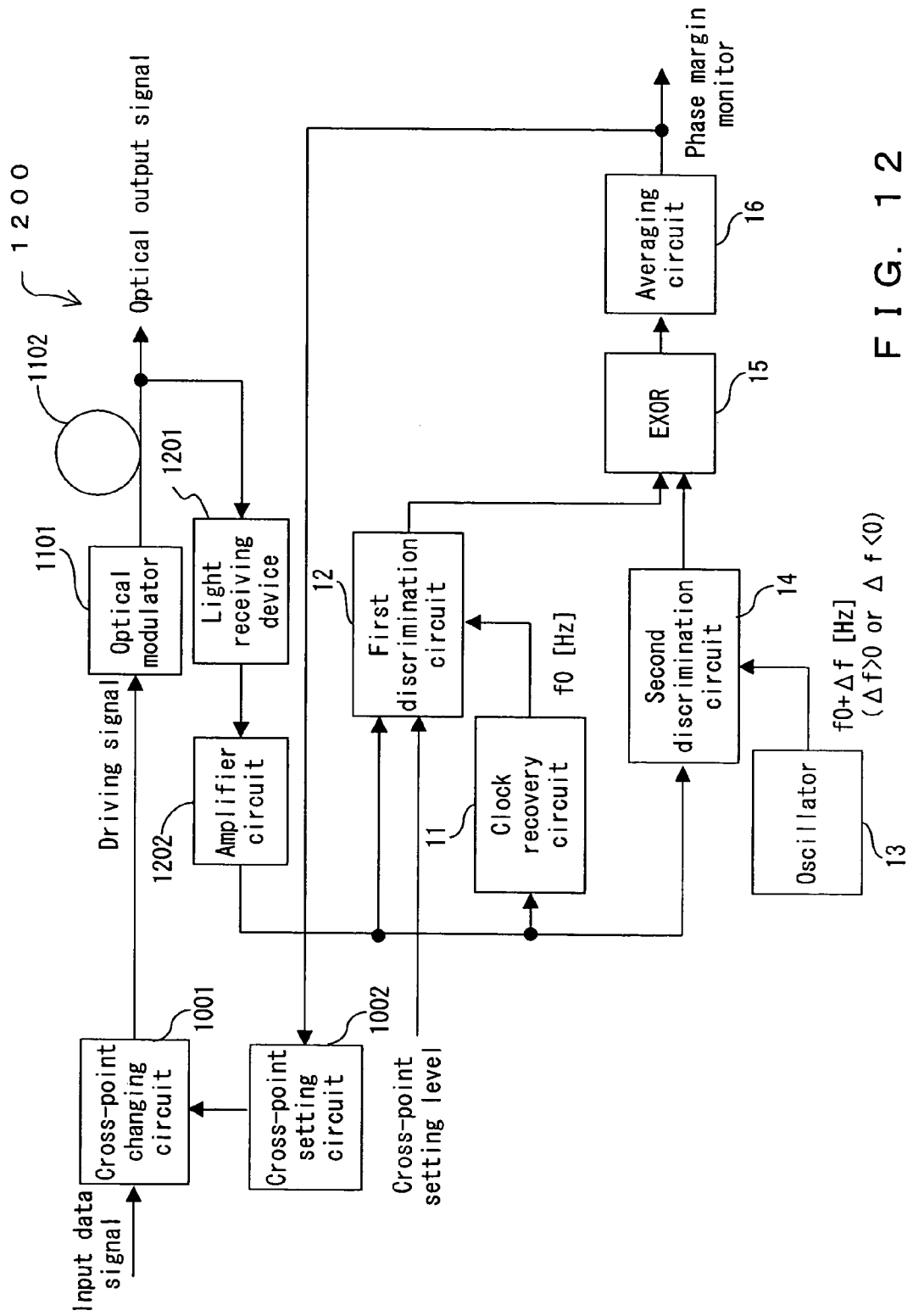
FIG. 12 shows a variation of the configuration of the optical transmitter 1100 shown in FIG. 11.

FIG. 12 shows a variation of the configuration of the optical transmitter 1100 shown in FIG. 11. In FIG. 12, the same reference numerals as those of FIG. 11 are attached to the same components.

In this preferred embodiment, the cross-point of a driving signal driving the optical modulator 1101 is controlled based on an optical output waveform after being modulated by the optical modulator 1101 so as to optimize an optical transmission waveform to be carried through an optical fiber.

The transmitter 1200 shown in FIG. 12 comprises a light receiving device 1201 inputting an optical transmission signal modulated by the optical modulator 1101 from the optical fiber 1102 carrying the optical transmission signal and converting the inputted optical transmission signal into an electrical signal, and an amplifier circuit 1202 amplifying the electrical signal. The transmitter 1200 controls the driving signal of the optical modulator 1101, based on the electrical signal obtained thus.

Since this operation is basically performed according to the same principle as described with reference to FIG. 11, its detailed description is omitted here.

Figure 13:
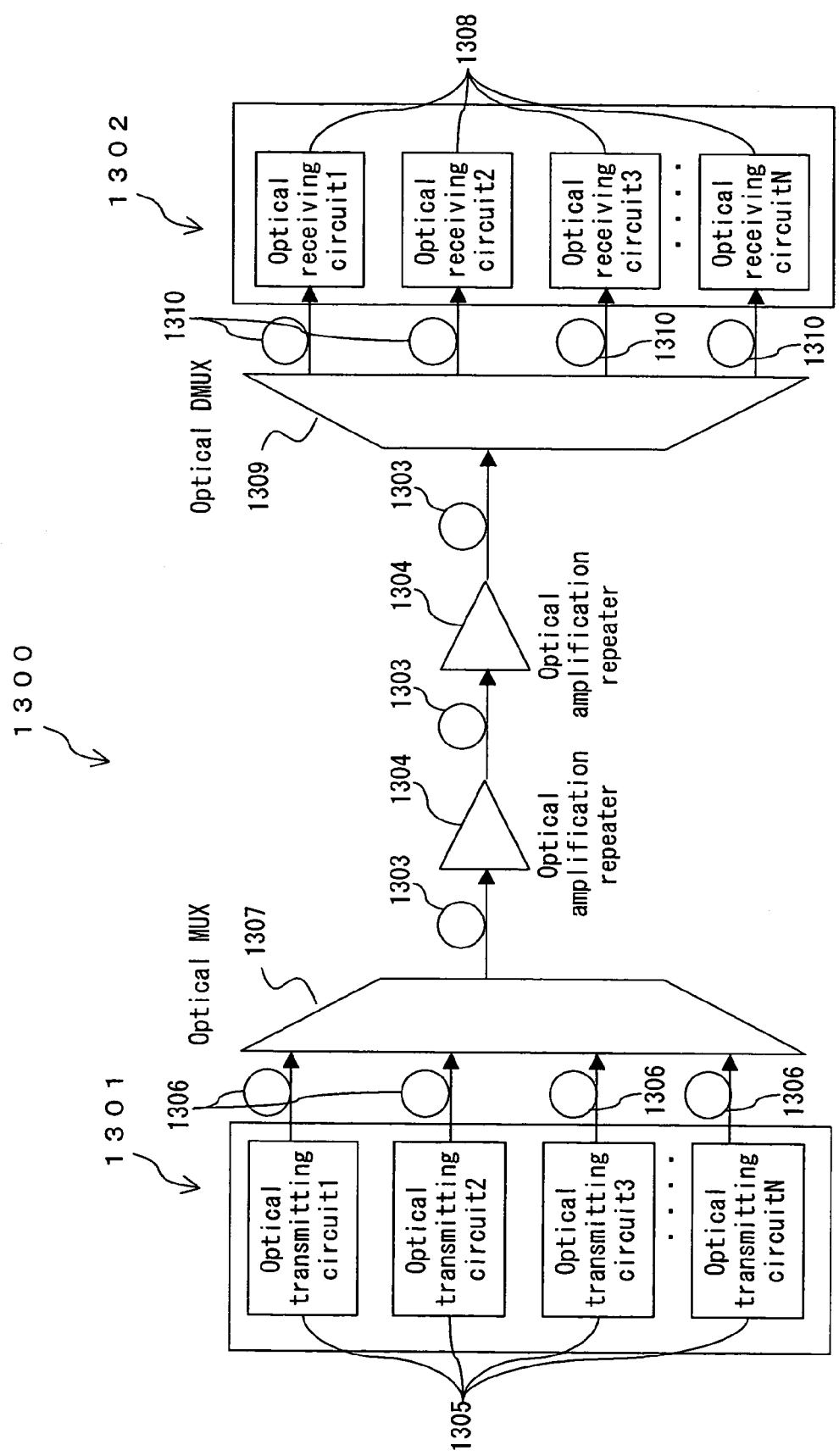
FIG. 13 shows an example of the configuration of an optical communication system.

FIG. 13 shows an example of the configuration of an optical communication system obtained by arbitrarily combining the optical transmitting device and optical receiving device.

In this preferred embodiment, a WDM (wavelength-division multiplex) device is composed of the optical transmitting device and optical receiving device.

The WDM device 1300 shown in FIG. 13 comprises an optical transmitting device 1301 and an optical receiving device 1302, which are connected through an optical fiber 1303. The optical fiber transmission line comprises an optical amplifier repeater 1304 amplifying attenuated light.

The optical transmitting device 1301 of this preferred embodiment comprises a plurality of optical transmitting circuits 1305 (1~N) (N: positive integer) optimizing a cross-point.

The optical transmitting circuit 1305 of this preferred embodiment comprises an electrical signal multiplexing unit multiplexing low-speed electrical signals into a 40 Gbps electrical signal. The 40 Gbps electrical signal is optically modulated by an optical modulator. By monitoring, for example, the driving signal of the optical modulator or the output signal after the optical modulation, the cross-point of the driving signal can be controlled so that the cross-points of these signals may become optimal. Thus, stable optical transmission signals each with a different wavelength can be outputted from each optical transmitting circuit 1305.

The optical signals outputted from each optical transmitting circuit 1305 travel through an optical fiber 1306 and are multiplexed by an optical multiplexer (optical MUX) 1307 and are transmitted to the optical receiving device 1302 through the optical fiber 1303 and optical amplifier repeater 1304.

The optical receiving device 1302 shown in FIG. 13 comprises a plurality of optical receiving circuits 1308 (1~N) (N: positive integer) setting the discrimination level of the first discrimination circuit to an optimal point. An optical transmission signal transmitted from the optical transmitting device 1301 through both the optical fiber 1303 and optical amplifier repeater 1304 is demultiplexed by an optical demultiplexer (optical DMUX) 1309 into optical transmission signals each with its original wavelength, and each demultiplexed transmission signal is inputted to each optical receiving circuit 1308 through an optical fiber 1310.

The optical receiving circuit 1308 converts the inputted 40 Gbps optical transmission signal into a 40 Gbps electrical signal by passing them through a light receiving device, and furthermore reshapes its waveforms or limits the band of noise by passing the signal through an equalizer circuit. Then, the optical receiving circuit 1308 reproduces the signal by controlling the 40 Gbps electrical signal so as to optimize the discrimination level.

As described above, the optical transmitting circuit 1305 can transmit highly accurate (for example, whose crosspoint is located at the center) transmission signals through the optical fibers 1306 or 1303 by setting the cross-point of the driving signal of the optical modulator or the like. The optical receiving circuit 1308 can optimize the discrimination level of the discrimination circuit and extract signals whose error rate (digital error rate) is greatly reduced.

By these optimization operations on the transmitting and receiving sides, optical transmission can be realized with a low error rate.

As described above, according to the preferred embodiments of the present invention, the phase margin of an input data signal can be monitored using clock signals each with a different frequency. According to the preferred embodiments of the present invention, as a phase margin increases, its phase margin monitor output decreases.

Therefore, if a cross-point (for example, a voltage level) is set in the first discrimination circuit, an input signal is controlled so that the cross-point of a signal inputted to the first discrimination circuit may coincide with a cross-point set in the first discrimination circuit.

Thus, not only the optimal point of a discrimination level or a cross-point can be easily set without considering the phase matching of clock signals, but also the error in signal reproduction of a receiving device can be remarkably suppressed.

If this discrimination phase margin monitor circuit is adopted, a variety of integrated-circuited devices using this circuit or an integrated-circuited part of each device can be realized since their circuit configurations are simple.

The present invention can be embodied in an arbitrary combination of the above-mentioned preferred embodiments or in a variety of other preferred embodiments without departing from the true spirit or subject matter of the present invention. Therefore, the above-mentioned preferred embodiments are only simple examples in all points and are not limited thereto. The scope of the present invention is defined by "What is claimed is:", and is not limited by the text of the specification. Furthermore, any variations and amendments to the scope equivalent to "What is claimed is:" are included in the present invention.

What is claimed is:

1. A discrimination phase margin monitor circuit comprising:
    a first discrimination circuit discriminating an input data signal using a clock signal extracted from the input data signal;
    a second discrimination circuit discriminating the input data signal using a clock signal with a frequency different from that of the clock signal; and
    an operation circuit calculating an exclusive OR of an output signal of the first discrimination circuit and an output signal of the second discrimination circuit and obtaining a phase margin monitor output signal by averaging results of the exclusive OR calculating,
    wherein a reciprocal of an absolute value of a frequency difference between the two clock signals is smaller than a time constant of an averaging circuit.

2. A discrimination level optimization circuit, comprising:
    the discrimination phase margin monitor circuit according to claim 1; and
    a discrimination level setting circuit setting a discrimination level of the first discrimination circuit, based on the phase margin monitor output signal.

3. The discrimination level optimization circuit according to claim 2, wherein said discrimination level setting circuit sets the discrimination level of the first discrimination circuit so as to maximize a phase margin of the input data signal, based on the phase margin monitor output signal.

4. The discrimination level optimization circuit according to claim 2, wherein
    said discrimination level setting circuit relates the phase margin monitor output signal to a discrimination level setting voltage of the first discrimination circuit needed to obtain the phase margin monitor output signal and stores them in memory as numerical information and detects a discrimination level setting voltage in which a value of the phase margin monitor output signal becomes a minimum when changing the discrimination level setting voltage of the first discrimination circuit, according to the numerical information stored in the memory.

5. The discrimination level optimization circuit according to claim 2, wherein
    said discrimination level setting circuit multiplies the phase margin monitor output signal by a low-frequency signal, changes a voltage of a signal obtained after the multiplied signal travels through a low-pass filter in an increasing direction of a phase margin and outputs a signal, obtained by adding the low-frequency signal to the voltage signal, to the first discrimination circuit.

6. A receiving device, comprising:
    a light receiving device converting an optical transmission signal that travels through an optical fiber into an electrical signal;
    an equalizer circuit reshaping a waveform of the electrical signal converted by the light receiving device and limiting a band of the electrical signal; and
    the discrimination level optimization circuit according claim 2, whose input data signal is a signal output from the equalizer circuit.

7. An optical multiplex signal receiving device, comprising:
    a plurality of the receiving devices according to claim 6; and
    a demultiplexing device demultiplexing an optical multiplex signal transmitted through an optical fiber,
    wherein each receiving device separately discriminates each signal demultiplexed by the demultiplexing device.

8. An optical communication system composed of an optical multiplex signal transmitting device and an optical multiplex signal receiving device, comprising
    the optical multiplex signal receiving device according to claim 7.

9. A cross-point optimization circuit, comprising:
a cross-point changing circuit changing a cross-point of an input data signal and generating an output data signal; and
a discrimination phase margin monitor circuit, comprising:
  a first discrimination circuit discriminating the output data signal of the cross-point changing circuit as an input data signal, using a clock signal extracted from the input data signal;
  a second discrimination circuit discriminating the input data signal using a clock signal with a frequency different from that of the clock signal, and
  an operation circuit calculating an exclusive OR of an output signal of the first discrimination circuit and an output signal of the second discrimination circuit and obtaining a phase margin monitor output signal by averaging results of the exclusive OR calculating,
  wherein a reciprocal of an absolute value of a frequency difference between the two clock signals is smaller than a time constant of an averaging circuit; and
a cross-point setting circuit monitoring the phase margin monitor output signal and controlling the cross-point changing circuit so as to maximize a phase margin of the output data signal of the cross-point changing circuit.

10. The cross-point optimization circuit according to claim 9, wherein said cross-point setting circuit controls the cross-point changing circuit so that a cross-point of the output data signal of the cross-point changing circuit coincides with a discrimination level set in the first discrimination circuit.

11. The cross-point optimization circuit according to claim 9, further comprising an adjustment circuit adjusting a discrimination level of the first discrimination circuit.

12. A transmitting device, comprising:
the cross-point optimization circuit according to claim 9; and
an optical modulation circuit optically modulating a signal using an output data signal output from the cross-point changing circuit as a driving signal and transmitting the signal after optical modulation to an optical fiber.

13. The transmitting device according to claim 12, further comprising:
a light receiving device converting the signal after optical modulation that goes through the optical fiber into an electrical signal; and
an amplifier circuit amplifying the electrical signal converted by the light receiving device,
wherein the input data signal of said discrimination level margin monitor circuit is the signal output from the amplifier circuit.

14. An optical multiplex signal transmitting device, comprising:
a plurality of the transmitting devices according to claim 12; and
an optical multiplexing device multiplexing each optical output signal output from each transmitting device and transmitting the multiplex signal to the optical fiber.

15. An optical communication system composed of an optical multiplex signal transmitting device and an optical multiplex signal receiving device, comprising
the optical multiplex signal transmitting device according to claim 14.

* * * * *